Patented Aug. 2, 1932

1,870,175

UNITED STATES PATENT OFFICE

CAMILLE DREYFUS, OF BASEL, SWITZERLAND, WILLIAM McC. CAMERON, OF NEW YORK, N. Y., AND GEORGE SCHNEIDER, OF MOUNTAIN LAKES, NEW JERSEY, ASSIGNORS TO CELANESE CORPORATION OF AMERICA, A CORPORATION OF DELAWARE

MANUFACTURE OF COMPOSITIONS AND ARTICLES FROM CELLULOSE DERIVATIVES

No Drawing. Application filed May 29, 1922. Serial No. 564,570.

This invention relates to the manufacture of compositions and articles from esters or ethers or cellulose (hereinafter included in the term cellulose derivative) and in particular cellulose acetate.

We have found the surprising fact that by heating cellulose acetate in a rosin bath the cellulose acetate runs together in a melted or semi-melted mass to a compound. When this mass is treated under heat and pressure, with or without the addition of filling materials; with or without the addition of dyes or dyestuffs; with or without the addition of camphor, camphor substitutes, high boiling point solvents, camphor, camphor substitutes, triacetin, oily xylene monomethyl sulfonamid, diethyl phathalate, dimethyl phathalate, triphenylphosphate or other plasticizing agents, which term includes high boiling point solvents and softening agents, with or without stabilizers; with or without the addition of other products, such as rosin, compositions, etc. in moulds or other devices, articles of remarkable qualities are obtained.

We have further found that when acetate of cellulose is heated together with an appropriate amount of rosin and triacetin or other such plasticizing agent a homogeneous solution is obtained which, on cooling, sets to a more or less hard and plastic compound.

*Example No. 1:* When cellulose acetate is introduced in melted rosin and heated therewith under sufficient stirring and the proper temperature, a vitreous melted or semi-melted mass is obtained, which can be easily removed from the liquid rosin. At a temperature of 170° to 200° centigrade the operation takes place favorably and rapidly. By incorporating oily xylenemonomethylsulfonamid, or triacetin, or other appropriate plasticizing agents, the operation takes place at lower temperature than above. After removing the melted mass from the rosin bath, the remaining rosin can be used for a second melting operation.

*Example No. 2:* Cellulose acetate containing, for example, 30% of its weight in triacetin and 10% of triphenylphosphate, is treated in the same way as under Example 1 with an excess of hot melted rosin. The reaction takes place at a lower temperature than stated in Example 1 and the resulting melted mass is somewhat softer than the one obtained by Example 1. After removing the melted mass from the rosin bath, the remaining rosin can be used for a second melting operation.

*Example No. 3:* Cellulose acetate containing, for example, 30% of its weight in oily xylene monomethyl sulfonamid and 10% of triphenylphosphate, is treated in the same way as under Example 1 with an excess of hot melted rosin. The reaction takes place at a lower temperature than stated in Example 1 and the resulting melted mass is somewhat softer than the one obtained by Example 1. After removing the melted mass from the rosin bath, the remaining rosin can be used for a second melting operation.

*Example No. 4:* Five (5) parts rosin, 6.5 parts triacetin and 7.5 parts acetate of cellulose are heated together until a homogeneous solution is obtained, which takes place at a temperature over 100° up to 150° centigrade or more. After cooling, a tough homogeneous composition is obtained which can be used with or without the addition of other ingredients for moulding purposes or for the manufacture of lacquer, varnishes and articles of all kind.

*Example No. 5:* Fifteen (15) parts cellulose acetate, 17 parts oily xylene monomethyl sulfonamid and 23 parts of rosin are treated in the same way as in Example 4, and a similar product of similar qualities is obtained as mentioned in Example 4.

The melted masses produced under Examples 1, 2 and 3 can be used as such and pressed under heat in moulds or on or in other devices, with or without the addition of other ingredients, producing articles of remarkable strength and qualities. On the other hand, the melted masses obtained under Examples 1, 2 and 3 can be pulverized (if advisable to do so) any excess rosin can be extracted by a solvent, or the powdered mass can be used without extraction of the excess of rosin. The powder so obtained (even if it contains excess of rosin) can be pressed as such in moulds or other devices under heat with or without the mixture of other ingredients, such as filling materials, effect materials, dyes, dyestuffs, softening agents, plasticizing agents, gelatinizers, stabilizers, or other appropriate ingredients. The masses obtained under Examples 4 and 5 can be pressed under heat in moulds or other devices with or without the addition of ingredients.

In all examples moulded or pressed articles are obtained of remarkable qualities, ranging from hard to soft, as desired. Core pieces can be incorporated or imbedded in the moulds or mouldings as desired.

These masses (especially the softer ones) can be easily pressed under heat on other articles, such as cardboard, wood or articles of other materials.

The masses so produced can be used for the manufacture of articles of all kinds such as moulded articles, phonograph records, lacquers, varnishes, etc.

The mixture of cellulose acetate with rosin or the mixture of cellulose acetate plus rosin and triacetin and ingredients can be executed in any other suitable or appropriate way, for instance, cellulose acetate powder can be mixed with triacetin and rosin on heated rollers in the presence or absence of other ingredients, such as filling materials, etc., and then pressed in moulds, or the like, or in any other appropriate device used for making phonograph records or any other moulded article. Instead of cellulose acetate, other cellulose ester or cellulose ethers can be used.

The above description does not limit this invention and the above examples can be varied, within wide limits.

The term "melted" employed in the claims hereto is used in the broad sense to include the melted and semi-melted forms.

What we claim is:

1. Process of melting an organic derivative of cellulose comprising heating the organic derivative of cellulose in the presence of an excess quantity of rosin to a temperature sufficient to melt the organic derivative of cellulose, whereby two layers of molten material are formed, one layer consisting of rosin and the other layer containing the molten organic derivative of cellulose.

2. Process of melting cellulose acetate comprising heating the cellulose acetate in the presence of an excess quantity of rosin to a temperature sufficient to melt the cellulose acetate, whereby two layers of molten material are formed, one layer consisting of rosin and the other layer containing the molten cellulose acetate.

3. In the process for the manufacture of plastic masses and articles containing an organic derivative of cellulose, the step of heating the organic derivative of cellulose in the presence of rosin until the organic derivative of cellulose melts.

4. In the process for the manufacture of plastic masses and articles containing an organic derivative of cellulose, the step of melting the organic derivative of cellulose in the presence of rosin and a plasticizing agent.

5. Process for the manufacture of articles comprising plastic materials containing an organic derivative of cellulose, said process comprising melting the organic derivative of cellulose in the presence of rosin, permitting the mass to harden and subsequently subjecting the resulting plastic material to molding pressure under heat.

6. Process for the manufacture of articles comprising plastic material containing an organic derivative of cellulose, said process comprising melting the organic derivative of cellulose in the presence of rosin, permitting the mass to harden, powdering the mass, extracting the excess rosin with a solvent for the rosin, and subsequently subjecting the resulting plastic material to molding pressure under heat.

7. In the process for the manufacture of plastic masses and articles containing cellulose acetate, the step of melting cellulose acetate in the presence of rosin.

8. In the process for the manufacture of plastic masses and articles containing cellulose acetate, the step of melting cellulose acetate in the presence of rosin and a plasticizing agent.

9. Process for the manufacture of articles comprising plastic material containing cellulose acetate, said process comprising melting cellulose acetate in the presence of rosin, permitting the mass to harden, and subsequently subjecting the resulting plastic material to molding pressure under heat.

10. Process for the manufacture of articles comprising plastic material containing cellulose acetate, said process comprising melting cellulose acetate in the presence of rosin and a plasticizing agent, permitting the mass to harden and subsequently subjecting the resulting plastic material to molding pressure under heat.

In testimony whereof we have hereunto subscribed our names this 26th day of May, 1922.

CAMILLE DREYFUS.
WM. McC. CAMERON.
GEORGE SCHNEIDER.